(12) United States Patent
McClure

(10) Patent No.: US 6,810,650 B2
(45) Date of Patent: Nov. 2, 2004

(54) REPLACEABLE WINDGUARD TINES FOR A ROUND BALER

(75) Inventor: John R. McClure, New Holland, PA (US)

(73) Assignee: New Holland North America, Inc., New Holland, PA (US)

( * ) Notice: Subject to any disclaimer, the term of this patent is extended or adjusted under 35 U.S.C. 154(b) by 0 days.

(21) Appl. No.: 10/108,833

(22) Filed: Mar. 28, 2002

(65) Prior Publication Data

US 2003/0182921 A1 Oct. 2, 2003

(51) Int. Cl.$^7$ .............................................. A01D 43/00
(52) U.S. Cl. ........................................................ 56/190
(58) Field of Search ............................ 56/190, 364, 341, 56/400, 16.1; 100/88

(56) References Cited

U.S. PATENT DOCUMENTS

| | | | |
|---|---|---|---|
| 2,603,936 A | | 7/1952 | Keene |
| 2,691,266 A | | 10/1954 | Meyer et al. |
| 2,872,772 A | * | 2/1959 | Nolt ............................. 56/364 |
| 3,924,391 A | * | 12/1975 | Cheatum ....................... 56/364 |
| 4,304,090 A | * | 12/1981 | Gavrilenko et al. .......... 56/364 |
| 4,411,127 A | * | 10/1983 | Diederich et al. ............. 56/364 |
| 4,463,546 A | | 8/1984 | Day |
| 4,516,389 A | * | 5/1985 | Core ............................. 56/341 |
| 4,524,576 A | | 6/1985 | Probst |
| 4,565,057 A | | 1/1986 | Vissers et al. |

* cited by examiner

*Primary Examiner*—Árpád Fab Kovács
(74) *Attorney, Agent, or Firm*—John William Stader; Collin A. Webb

(57) ABSTRACT

The device consists of a replaceable windguard tine for a windguard assembly on an agricultural round baler. The windguard tine comprises a first tine portion parallel to a second tine portion. A support region connects the first tine portion and second tine portion. The windguard pipe has a series of tine apertures through which the first and second tine portions are inserted. The support region is bound to the windguard pipe by using a clip. The clip has a tine catch and a pipe release to allow for easy removal and installation of the windguard tine.

5 Claims, 3 Drawing Sheets

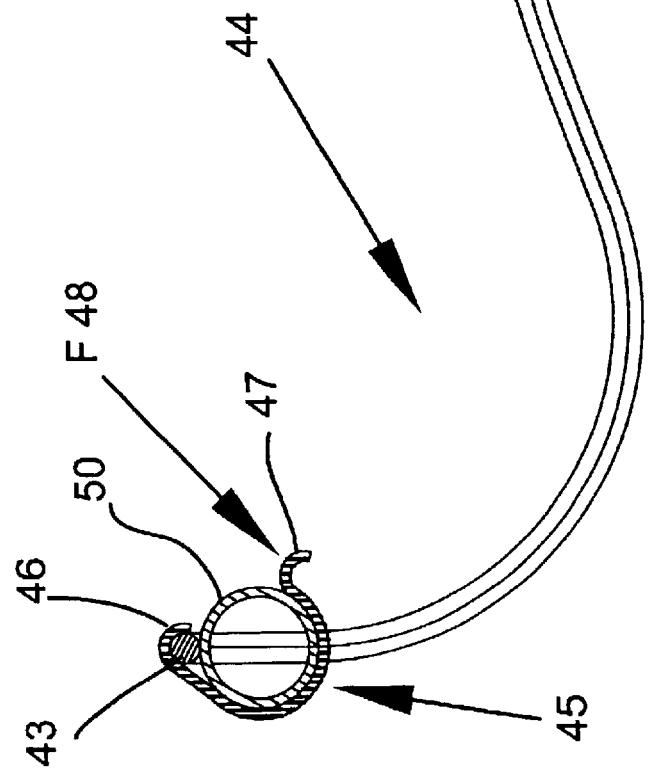
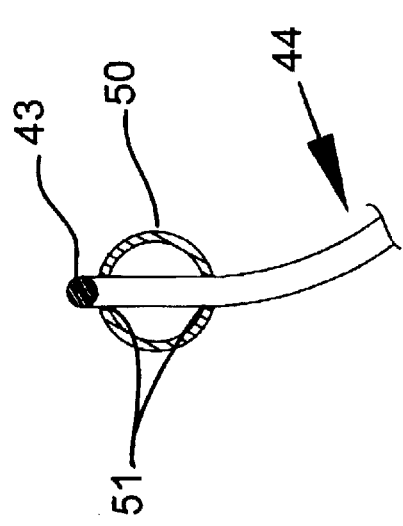
FIG 3
FIG 4

REPLACEABLE WINDGUARD TINES FOR A ROUND BALER

FIELD OF THE INVENTION

This invention relates to the improvement of an agricultural round baler. More specifically it relates to an improvement for the attachment and removal of windguard tines on a windguard assembly.

BACKGROUND OF THE INVENTION

Agricultural round balers have been used for several decades to collect and bind crop material so as to facilitate the storage of crop material for later use. Generally, a mower or mower-conditioner cuts the crop and arranges it in a windrow for drying. A general example of a disc mower-conditioner is the New Holland Discbine® disc mower conditioner model 1431 manufactured by New Holland North America, Inc. Later, an agricultural tractor pulls a baler over the windrow to collect the crop material. The baler's windrow pickup gathers the cut and windrowed crop and lifts it into the baling chamber. The baling chamber consists of a pair of opposing sidewalls with a series of belts that rotate and compress the crop material into a cylindrically shaped bale. When the bale has achieved a desired size and density, the operator wraps the bale to ensure that the cylindrical and compact nature of the bale is maintained. There are many wrapping materials and methods of wrapping the bale depending on a variety of factors. Initially, twine was used to wrap the bale. Later netwrap and silage sheets were introduced. After the bale is bound or wrapped, the farmer ejects it from the baler for later pickup.

As previously mentioned, there are a variety of agricultural round balers. A general example of this device is illustrated by the New Holland Roll-Belt™ Round Baler model number 678 manufactured by New Holland North America, Inc. Generally, round balers are pulled by an agricultural tractor and receive rotational power from the tractor's power-take-off shaft positioned at the rear of the tractor. The energy is transmitted to a gearbox positioned on the baler. Some balers also use a hydraulic motor and pump arrangement to provide energy to the various baler elements such as the various rollers and belts. As previously discussed, located near the front of the baler is the windrow pickup. This assembly picks up the windrow and feeds it into the baling chamber. Positioned above the windrow pickup is the windguard assembly. It ensures that the crop material is properly feed into the baling chamber in spite of any wind or varying crop conditions. Typically, the windguard assembly consists of a pipe and a series of windguard tines held in position above and in front of the pickup. The pipe may be raised or lowered by adjusting a chain and a tine adjustment mechanism. Affixed to the pipe are a series of windguard tines. These tines frequently break off or are damaged during the life of the baler. The windguard tines are typically wrapped, welded or bolted onto the pipe making replacement difficult. The prior art shows a variety of means to attach the windguard tines to the pipe, however these methods have not been entirely successful.

U.S. Pat. Nos. 4,565,057, 4,524,576 and 4,463,546 disclose conventional methods for attaching a tine to a pipe. U.S. Pat. No. 4,565,057 illustrates a pair of tines wrapped about the pipe. U.S. Pat. No. 4,524,576 illustrates some tines inserted through the pipe and other tines bolted on the pipe. U.S. Pat. No. 4,463,546 illustrates tines that are bolted to a surface or pipe. It is difficult to remove the remaining portion of the tine. Furthermore it is difficult to easily replace such tines without proper tools or welding devices. U.S. Pat. No. 2,603,936 discloses a snap lock pickup finger for harvester reels. In this approach, a portion of the tine is inserted into a circular member that is integral to the tine. However, with this approach, it is difficult to make a tine with a sufficient material cross section capable of being bent and surviving the rigors of a harvesting environment. A tine of this design would have to have a fairly thin cross section that would limit its ability to retain its shape or survive during the relatively harsh baling processes.

Consequently, the need exists for an improved windguard tine that can be easily removed for servicing or replacement with a minimum of tools.

OBJECTS OF THE INVENTION

It is an object of the present invention to provide a windguard tine that is easy to replace.

It is a further object of the present invention to provide a windguard tine that can be attached to the windguard pipe on a conventional round baler's windguard assembly without tools.

It is a further object of the present invention to provide a windguard tine that is affixed to a windguard assembly without bolts, wrapping or welding.

It is a further object of the present invention to provide a windguard tine that may be easily removed for repair or servicing.

SUMMARY OF THE INVENTION

The invention overcomes the deficiencies of the prior art. The invention is an improvement to the windguard tines on an agricultural round baler. The device consists of a windguard pipe having tine apertures therein. The first tine portion and second tine portion of a windguard tine are inserted in the tine apertures. Connecting the first and second tine portions is the support region of the windguard tine. A removable clip having a tine catch and pipe release binds the support region of the windguard tine to the windguard pipe. The use of the clip with a pipe release allows the windguard tine to be easily removed without tools for either repair or replacement of the tine.

BRIEF DESCRIPTION OF THE DRAWINGS

The advantages of this invention will be apparent upon consideration of the following detailed disclosure of the invention, especially when taken in conjunction with the accompanying drawings wherein:

FIG. 3 is cut away view of along line 3 of FIG. 2 to better show the parts relating to the present invention.

FIG. 4 is a cut away view of along line 4 of FIG. 1 to better show the tine apertures of the present invention.

DETAILED DESCRIPTION OF THE INVENTION

Figure 1:
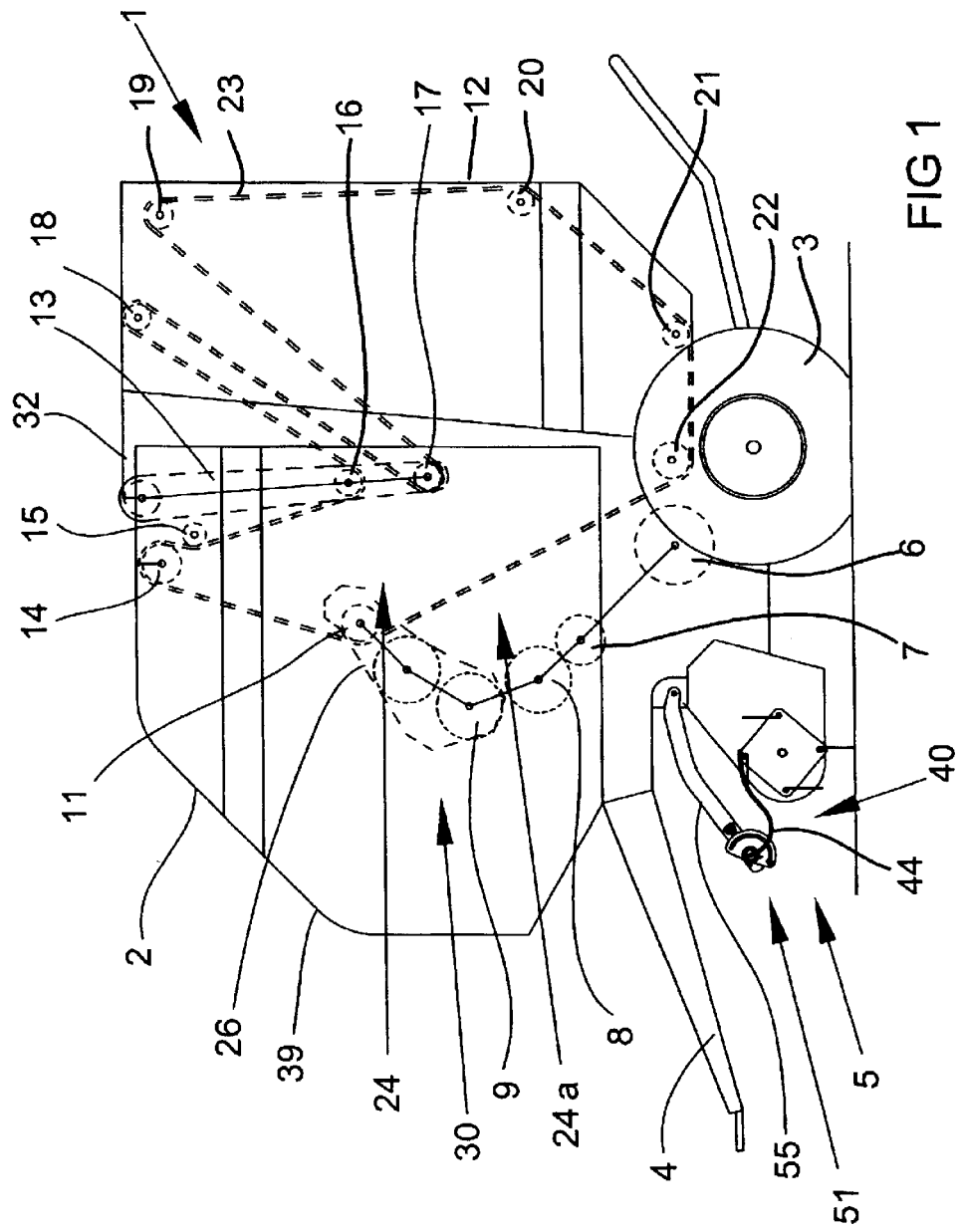
FIG. 1 is a side elevation of a round baler with parts in position to begin picking up crop material to from a cylindrical bale.

Referring to the drawings, it is possible to observe the major elements and general operation of the present invention. Left and right references are used as a matter of convenience and are determined by standing at the rear of the round baler and facing the forward end in the normal direction of travel. Likewise, forward and rearward are determined by normal direction of travel of the tractor or round baler. Upward or downward orientations are relative to the ground or operating surface. Horizontal or vertical planes are also relative to ground.

FIG. 1 illustrates a conventional round baler 1 with the baling chamber 24a ready to receive crop material. The round baler 1 is attached to a tractor (not shown) by means of a tongue 4. Rotational power from the tractor's power-take-off shaft (not shown) is transmitted to a gearbox 34 via a drive shaft. This is the source of power to operate the round baler. It is also possible that a hydraulic motor and pump arrangement may be used.

The round baler 1 has a main frame 2 supported by a pair of tires (only one shown) 3. A pickup 5 is positioned in front of the tires 3. The baling chamber 24a is defined by a pair of opposing baling chamber sidewalls 24 and a series of rubber belts defining an apron 23. Further defining the bale chamber 24a is the floor roll 6, starter roll 7 and stationary dimple roll 8 and a sledge assembly 26. The baling chamber 24a has tailgate 12 that pivots about the tailgate pivot 32 to separate the tailgate 12 from the front portion 39 of the baler 1.

The series of rubber belts or apron 23 encircle the sledge follower roll 11, drive roll 14, backwrap roll 15, front serpentine roll 16, rear serpentine roll 17, top/front tailgate idler roll 18, top/rear tailgate idler roll middle tailgate idler roll 19, middle tailgate idler roll 20, bottom tailgate idler roll 21 and nose roll 22. The length of the apron 23 is adjusted by a pivoting serpentine take up arm 13. The serpentine take up arm 13 rotates counter-clock wise (as seen in FIG. 1) as the crop material enters the bale chamber 23 and increases the length of the apron 23 as the size of the bale increases.

Generally, the tractor pulls the baler 1 over a windrow of previously cut crop. The pickup 5 inserts the crop between the floor roll 6 and starter roll 7 into the baling chamber 24a. As more crop material enters the bale chamber 24a, the serpentine take up arm 14 and sledge assembly 26 rotates counter-clockwise (as viewed in FIG. 1) to allow additional crop material to enter the chamber 24a while ensuring that proper pressure is maintained on the bale. When the bale chamber 24a is full, the bale wrapping system 30 engages and wraps the bale. Once the bale is wrapped, the tailgate 12 raises and ejects the bale from the bale chamber 24a and away from the round baler 1 and tractor.

Figure 2:
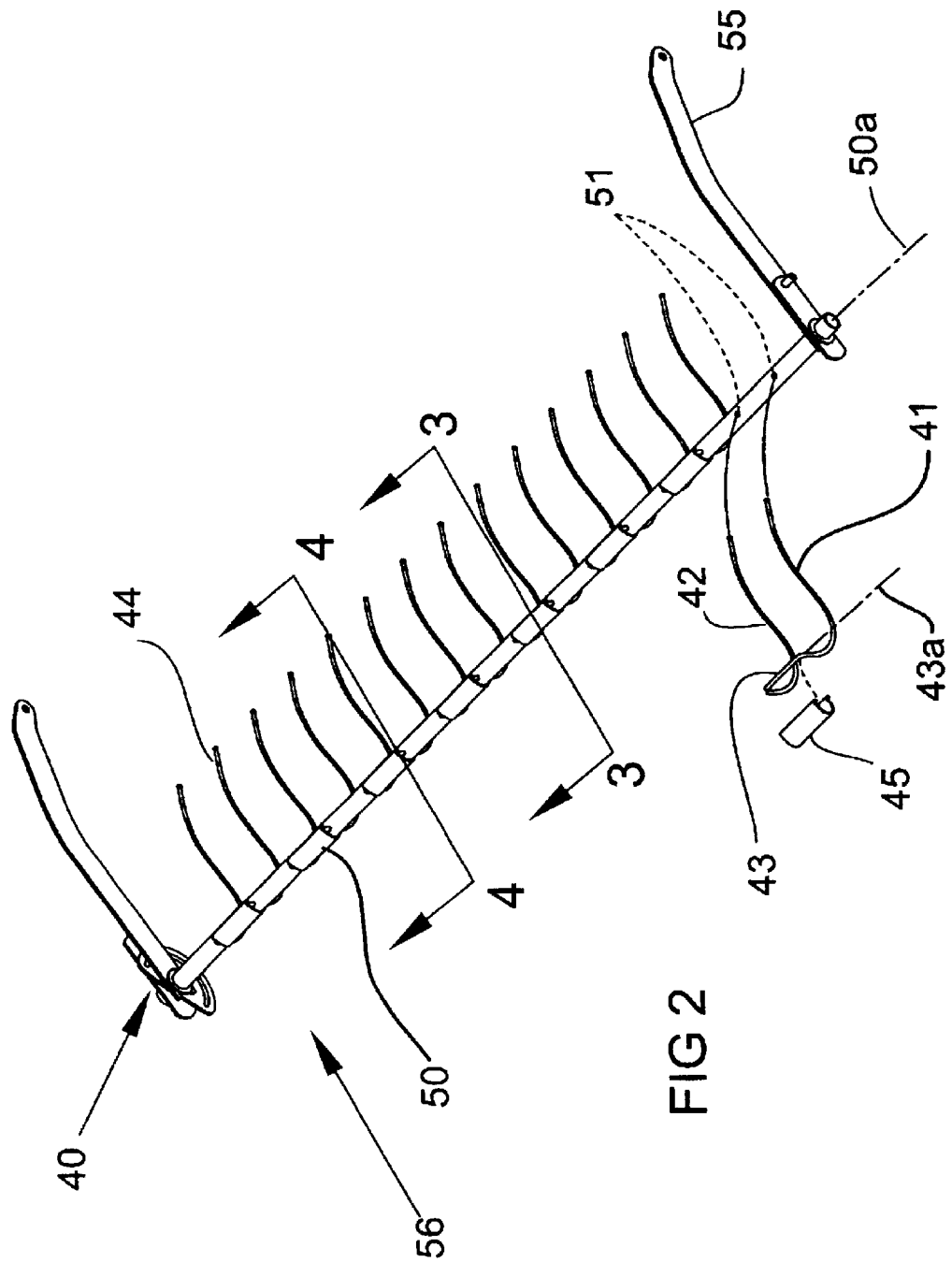
FIG. 2 is a view isometric view of the windguard assembly, with an exploded view of the present invention.

The present invention is visible in FIGS. 2 and 3 and is located on the windguard assembly 40. As previously mentioned, the windguard assembly 40 consists of a pair of windguard arms 55 attached to the main frame 2 of the round baler 1. Attached to between the arms 55 is the windguard pipe 50. There are a series of holes or tine apertures 51 that are in the windguard pipe 50. A conventional chain (not shown) and a conventional tine adjustment mechanism 56 can adjust the position of the pipe 50. As seen in FIG. 2, the windguard pipe 50 has an axis 50a.

A series of windguard tines 44 are inserted through the tine apertures 51. Each windguard tine 44 consists of a first tine portion 41 that is generally parallel to a second tine portion 42. Conventional windguard tines 44 are generally curved, however a variety of shapes are possible. Connecting the first tine portion 41 and second tine portion 42 is a support region 43. The support region 43 is generally perpendicular to the first tine portion 41 and second tine portion 42. The support region 43 has a support region axis 43a that is generally parallel to the windguard pipe axis 50a after the tine portions 41 and 42 are inserted into the tine apertures 51.

A clip 45 binds the support region 43 to the pipe 50. As seen in FIG. 3, the clip 45 has a tine catch 46 that partially encompasses the support region 42. The clip 45 also has a curved pipe release 47. The clip 45 is sufficiently flexible enough to allow the clip 45 to bend, yet strong enough to permit the clip 45 to affix the windguard tine 44 to the pipe 50.

Typically, the first tine portion 41 and second tine portion 42 are inserted into adjacent tine apertures 51 located in the windguard pipe 50. The support region 43 is placed into contact with the pipe 50, such that the support region axis 43a and windguard pipe axis 50a are generally parallel. The tine catch 46 of the clip 45 is placed onto the support region 42. Using the pipe release 47, the clip is pulled around the pipe 50 until the windguard tine 44 is securely attached to the pipe 50. To remove the tine 44, a force F (48) is exerted near the pipe release 47. This will permit the clip 45 to release the support region 42 of the tine 44. Repairs or replacement of the tine 44 can now be accomplished without the use of tools to remove the tine 44 from the windguard pipe 50.

It will be obvious to those skilled in the art that various changes may be made without departing from the scope of the invention and the invention is not to be considered limited to what is illustrated in the drawings and described in the specification.

What is claimed is:

1. An agricultural round baler comprising:
   a. a main frame supporting a baling chamber and having a windrow pickup for moving crop material from the ground into the baling chamber;
   b. a pair of windguard arms pivotally affixed to said main frame adjacent said windrow pickup;
   c. an elongate windguard pipe affixed to and extending between said windguard arms above and adjacent said windrow pickup, said windguard pipe having a plurality of aperture pairs extending therethrough and regularly spaced along the length thereof between said windguard arms;
   d. a windguard tine having a generally flat-bottomed, in top plane view, U-shape configuration, where the legs of the configuration are parallel duplicate first and second tine portions interconnected by a support region, said first and second tine portions extending through one of said plurality of aperture pairs such that said tine portions are directed generally toward said main frame above said windrow pickup and said support region is in contact with said windguard pipe; and
   e. a manually removable clip extending generally between said first and second tine portions, said clip comprising an elongate flexible generally C-shaped body member partially enclosing said windguard pipe and having a catch therein to also partially enclose said support region, whereby sad clip compresses said support region into contact with said windguard pipe.

2. The round baler of claim 1, wherein:
   said windguard pipe has a first diameter and circumference and said clip has a second diameter, said second diameter being slightly larger than said first diameter, and said clip further enclosing more than one-half of said circumference of said windguard pipe, whereby said clip must flex to fasten onto said windguard pipe and said support region, putting a compression force between said windguard pipe and said support region.

3. The round baler of claim 2, wherein:
   said first and second tine portions are curvilinear in side view.

4. The round baler of claim 3, wherein:
   said clip further includes a pipe release comprising a curved portion on the end of said C-shaped body member for assisting in the removal of said clip from said windguard pipe.

5. The round baler of claim 4, wherein:
   a separate windguard tine extends through each of said plurality of aperture pairs, each held in position by a separate removable clip.

* * * * *